United States Patent
Qi et al.

(10) Patent No.: US 10,271,623 B1
(45) Date of Patent: Apr. 30, 2019

(54) SMART SELF-DRIVING SYSTEMS WITH MOTORIZED WHEELS

(71) Applicant: LINGDONG TECHNOLOGY (BEIJING) CO. LTD, Beijing (CN)

(72) Inventors: Ou Qi, Beijing (CN); Zhaoqiang Chen, Beijing (CN); Xingyu Lian, Beijing (CN); Guorong Ren, Beijing (CN); Bin Fan, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 0 days.

(21) Appl. No.: 16/046,194

(22) Filed: Jul. 26, 2018

Related U.S. Application Data

(63) Continuation of application No. PCT/CN2018/096545, filed on Jul. 20, 2018.

(30) Foreign Application Priority Data

Oct. 27, 2017 (CN) .......................... 2017 1 10304882
Oct. 27, 2017 (CN) ...................... 2017 2 1408637 U

(51) Int. Cl.
*A45C 5/14* (2006.01)
*A45C 13/26* (2006.01)
(Continued)

(52) U.S. Cl.
CPC .................. *A45C 5/14* (2013.01); *A45C 5/03* (2013.01); *A45C 13/262* (2013.01); *G05D 1/0088* (2013.01)

(58) Field of Classification Search
CPC .. A45C 4/14; A45C 5/03; B60K 7/007; B60K 7/00; B60K 2007/0076
(Continued)

(56) References Cited

U.S. PATENT DOCUMENTS 5,316,096 A 5/1994 Good
6,491,127 B1 * 12/2002 Holmberg ............ B60K 7/0007
180/21
(Continued)

FOREIGN PATENT DOCUMENTS

CN 204378181 U 6/2015
CN 205390655 U 7/2016
(Continued)

OTHER PUBLICATIONS

Cowa Robot. "COWAROBOT R1: The First Robotic Suitcase." YouTube, Jul. 20, 2016, https://www.youtube.com/watch?v=Cl2KeIDN-fQ&t=3s.
(Continued)

*Primary Examiner* — Tony H Winner
(74) *Attorney, Agent, or Firm* — Patterson + Sheridan, LLP

(57) ABSTRACT

A smart self-driving system includes a body, such as a piece of luggage, supported by a plurality of wheel assemblies. At least one wheel assemblies includes a wheel rotating motor configured to rotate a wheel of the wheel assembly to move the luggage in a given direction. At least one wheel assemblies includes a wheel orientation sensor configured to measure the orientation of the wheel. At least one wheel assembly includes a wheel orientation motor configured to orient the wheel in the given direction. The smart self-driving system is configured to move in forward direction that is different than a head direction of the body.

27 Claims, 12 Drawing Sheets

(51) Int. Cl.
*A45C 5/03* (2006.01)
*G05D 1/00* (2006.01)

(58) Field of Classification Search
USPC .............................................. 180/65.51, 6.5
See application file for complete search history.

(56) References Cited

U.S. PATENT DOCUMENTS

| | | | | |
|---|---|---|---|---|
| 7,210,545 | B1* | 5/2007 | Waid ................... | B60K 7/0007 |
| | | | | 180/19.1 |
| 7,249,643 | B2* | 7/2007 | Etzioni ................. | B62M 6/65 |
| | | | | 180/220 |
| 8,453,771 | B1* | 6/2013 | Hirschfeld ............ | B60L 8/003 |
| | | | | 180/65.1 |
| 9,661,905 | B2 | 5/2017 | O'Donnell et al. | |
| 2007/0080000 | A1 | 4/2007 | Tobey et al. | |
| 2010/0252338 | A1* | 10/2010 | Xie ...................... | B60K 7/0007 |
| | | | | 180/6.5 |
| 2014/0107868 | A1* | 4/2014 | DiGiacomcantonio .. | A45C 5/14 |
| | | | | 701/2 |
| 2014/0277841 | A1* | 9/2014 | Klicpera ............... | A45C 5/14 |
| | | | | 701/2 |
| 2015/0012163 | A1* | 1/2015 | Crawley ............... | B25J 11/008 |
| | | | | 701/23 |
| 2017/0049202 | A1 | 2/2017 | Nascimento | |
| 2017/0086549 | A1* | 3/2017 | Caputo .................. | A45C 5/14 |
| 2017/0174096 | A1* | 6/2017 | Wang .................... | B60L 15/02 |
| 2017/0220040 | A1* | 8/2017 | London ................. | G05D 1/0278 |
| 2017/0334516 | A1* | 11/2017 | Ferguson .............. | B62M 6/65 |
| 2018/0278190 | A1* | 9/2018 | Cerboneschi ......... | H02P 23/0077 |

FOREIGN PATENT DOCUMENTS

| | | |
|---|---|---|
| CN | 206249095 U | 6/2017 |
| CN | 107640016 A | 1/2018 |
| CN | 207374107 U | 5/2018 |
| CN | 101223070 | 7/2018 |
| DE | 19949351 A1 | 7/2001 |
| JP | 2011006314 A | 1/2011 |

OTHER PUBLICATIONS

Travelmate. "This Futuristic Robot Suitcase Moves on Its Own and Follows You." YouTube, Oct. 6, 2016, https://www.youtube.com/watch?v=Ai5haQmC97o.

90Fun. "90Fun Puppy1, The World's 1st Self-balance & Auto-follow Suitcase." YouTube, Jan. 9, 2018, https://www.youtube.com/watch?v=7KX5cYfNsnc.

International Search Report and Written Opinion for International Application No. PCT/CN2018/096545 dated Oct. 24, 2018.

* cited by examiner

SMART SELF-DRIVING SYSTEMS WITH MOTORIZED WHEELS

BACKGROUND

Field

Embodiments disclosed herein relate to smart self-driving systems with motorized wheels.

Description of the Related Art

Travelers are often required to transport luggage across long distances, such as within long corridors of airport terminals. Transporting luggage may be inconvenient, stressful, and require undesirable levels of physical exertion. Even luggage that can be rolled on wheels has to be pulled or pushed, which can strain the arms and back of a person transporting the luggage. Some developers have incorporated electronics and motors into their products to provide self-driving luggage. However, current self-driving luggage designs have fixed wheels that are limited in their operation and maneuverability, especially when being used in crowded places like airports, hotels, or a busy sidewalk.

Therefore, there exists a need for new and improved smart self-driving systems.

SUMMARY

A smart self-driving system comprising a body; and three or more wheel assemblies coupled to the body and configured to rotate and roll in a given direction, wherein two or more of the wheel assemblies include a wheel rotating motor configured to rotate a wheel of the wheel assembly to move the body in the given direction.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the disclosure include a smart luggage system that is self-driving and has one or more motorized wheel assemblies. The smart luggage system is configured to autonomously follow a user or object in a given direction. Although the embodiments of the smart luggage system are described and illustrated herein with respect to a suitcase, the embodiments may be used with other types of portable equipment, such as a shopping cart.

In one embodiment, the smart luggage system includes one or more wheel rotating motors and one or more wheel orientation sensors to help move the luggage in a given direction. In one embodiment, the smart luggage system includes one or more wheel rotating motors and one or more wheel steering motors to help move the luggage in a given direction. In one embodiment, the smart luggage system can move in a forward direction that is different from a head direction of the luggage.

Figure 1:
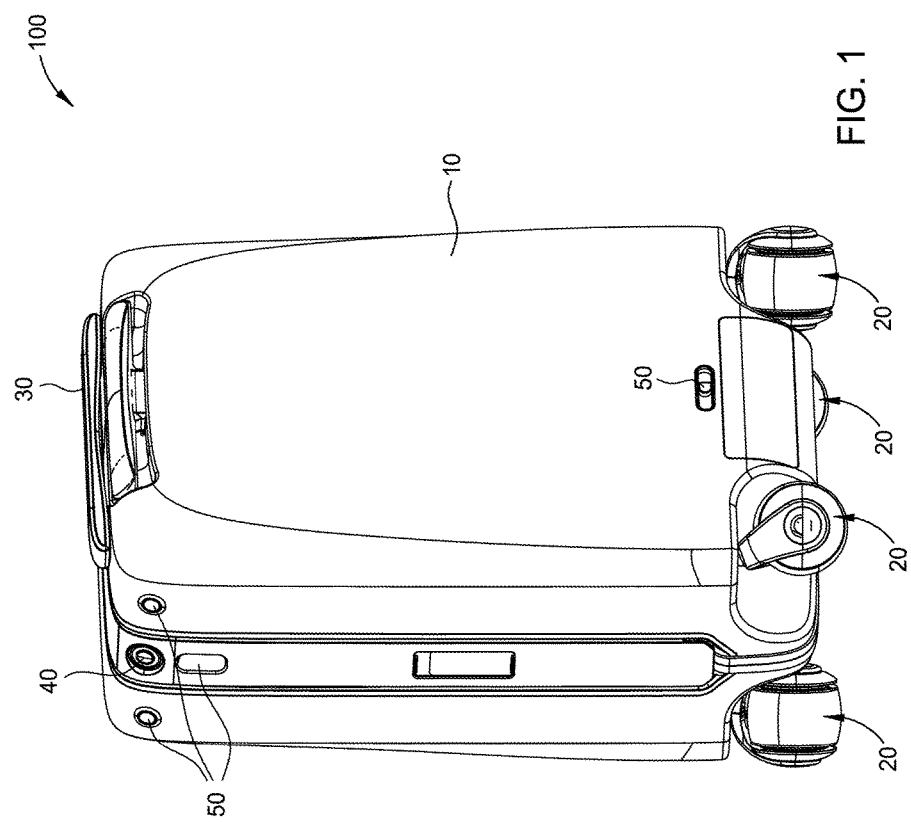
FIG. 1 is a perspective view of a smart luggage system according to one embodiment.

FIG. 1 is a perspective view of a smart luggage system 100 according to one embodiment. The smart luggage system 100 includes a body in the form of a piece of luggage 10, such as a suitcase, that can be used to store items for transport. The luggage 10 is supported by four wheel assemblies 20. Each wheel assembly 20 is configured to rotate in a given direction and roll in the given direction. According to one example, the wheel assemblies 20 may be caster-type wheels. All four of the wheel assemblies 20 may be motorized as further detailed below.

A handle 30 is provided to allow a user to push, pull, and/or lift the luggage 10. The handle 30 may include one or more touch sensors configured to switch the smart luggage system 100 to a manual control mode for manual operation by a user when touched by the user. The touch sensor may include a capacitive sensor, a restive sensor, an infrared touch sensor, and/or a surface acoustic wave (SAW) touch sensor.

The system 100 includes one or more cameras 40 coupled to the luggage 10. One camera 40 is shown located on a front side of the luggage 10 near the top end of the luggage 10 although any number of cameras 40 may be used. The camera 40 is configured to record visual images and/or detect the presence of nearby objects (similar to proximity sensors 50). The camera 40 may include a monocular camera, a binocular camera, and/or a stereo camera.

The system 100 includes one or more proximity sensors 50 coupled to the luggage 10. Three proximity sensors 50 are shown located on the front side of the luggage 10 near the top end of the luggage 10, and one proximity sensor 50 is shown located on a right side of the luggage 10 near the bottom end of the luggage 10. Any number of proximity sensors 50 may be used and located at different positions on the luggage 10. The proximity sensors 50 are configured to detect the presence of nearby objects and may include sonar sensors, infrared sensors, radar sensors, and/or LiDAR sensors.

Figure 2:
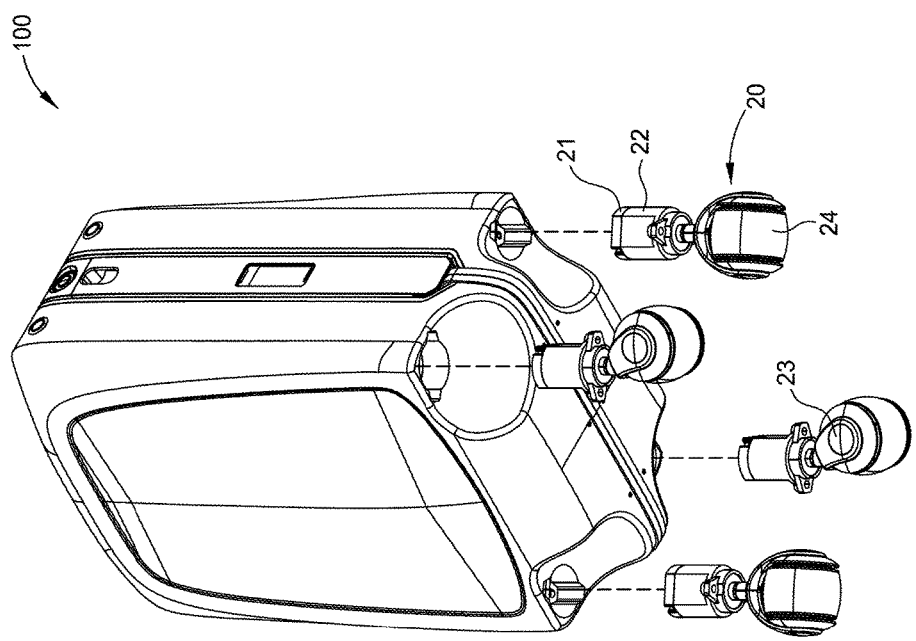
FIG. 2 is a perspective view of four wheel assemblies detached from the bottom of the smart luggage system according to one embodiment.

FIG. 2 is a perspective view of the four wheel assemblies 20 detached from the bottom end of the smart luggage system 100 according to one embodiment. Each wheel assembly 20 includes an upper slip ring housing 21 coupled to a lower slip ring housing 22. A motorized wheel 24 is coupled to the lower slip ring housing 22 by a wheel mount 23. The motorized wheel 24 is configured to both roll to move the luggage 10 and rotate (e.g. pivot or swivel) to change the direction of movement of the luggage 10.

In one embodiment, the two rear wheel assemblies 20 may be motorized while the two front wheel assemblies 20 may be normal wheel assemblies, e.g. non-motorized. In one embodiment, the two front wheel assemblies 20 may be motorized while the two rear wheel assemblies 20 may be normal wheel assemblies, e.g. non-motorized. In one embodiment, any one, two, or three of the wheel assemblies 20 may be motorized while the other wheel assemblies 20 are normal wheel assemblies, e.g. non-motorized.

Figure 3:
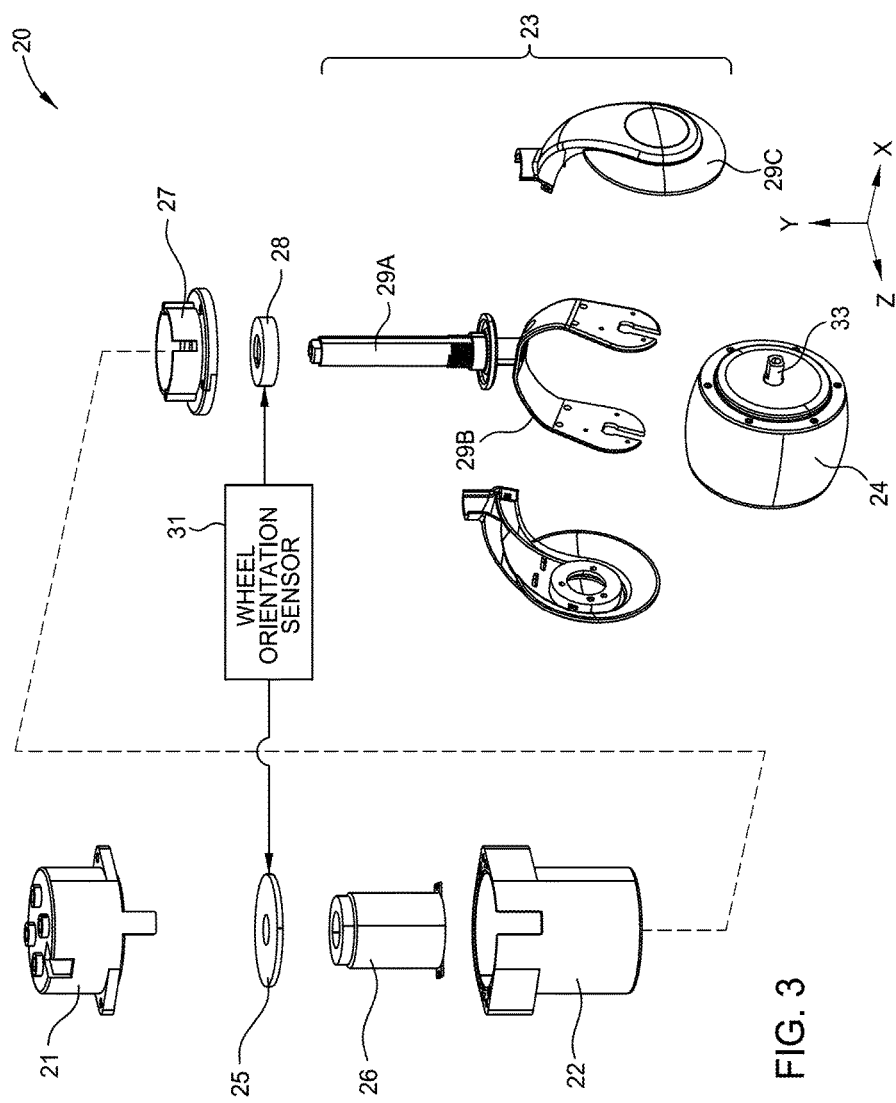
FIG. 3 is an exploded view of one of the wheel assemblies of the smart luggage system according to one embodiment.

FIG. 3 is an exploded view of one of the wheel assemblies 20 of the smart luggage system 100 according to one embodiment. The wheel assembly 20 includes a slip ring 26 disposed within the upper slip ring housing 21 and the lower slip ring housing 22. The slip ring 26 is configured to transmit electrical signals between components within the luggage 10 that are stationary and components within the wheel assembly 20 that are rolling and/or rotating.

The wheel assembly 20 further includes a magnetic rotary encoder 25, a bearing assembly 27, and a magnet 28 all coupled to the upper slip ring housing 21 and the lower slip ring housing 22. The combination of the magnetic rotary encoder 25 and the magnet 28 functions as a wheel orientation sensor 31 configured to measure and transmit a signal corresponding to the orientation of the motorized wheel 24. Information regarding the orientation of the motorized wheel 24, such as relative to the luggage 10, can be used to help direct the luggage 10 in a given direction.

The motorized wheel 24 is coupled to the upper slip ring housing 21 and the lower slip ring housing 22 by the wheel mount 23. The wheel mount 23 includes a shaft 29A, a yoke 29B, and an outer housing 29C. The motorized wheel 24 has an axle 32 that is secured within the yoke 29B. The motorized wheel 24 is configured to roll along the ground relative to the wheel mount 23 about the X-axis, which is parallel to the longitudinal axis of the axle 32 as shown (e.g. the centerline of the motorized wheel 24). The motorized wheel 24 and the wheel mount 23 are rotatable (e.g. can pivot or swivel) together relative to the longitudinal axis of the upper slip ring housing 21 and the lower slip ring housing 22 about the Y-axis, which is parallel to the longitudinal axis of the shaft 29A as shown. The motorized wheel 24 is configured to roll and rotate about two different axes. In one embodiment, the axis about which the motorized wheel 24 rolls (e.g. X-axis) may be offset from the axis about which the motorized wheel 24 rotates (e.g. Y-axis). In other words, the Y-axis about which the motorized wheel 24 rotates is offset from the X-axis, which is the centerline about which the motorized wheel 24 rolls. In one embodiment, the axis about which the motorized wheel 24 rolls (e.g. X-axis) may be in the same plane as the axis about which the motorized wheel 24 rotates (e.g. Y-axis). In other words, the Y-axis about which the motorized wheel 24 rotates is mutually orthogonal and coincides with the X-axis, which is the centerline about which the motorized wheel 24 rolls.

Figure 4:
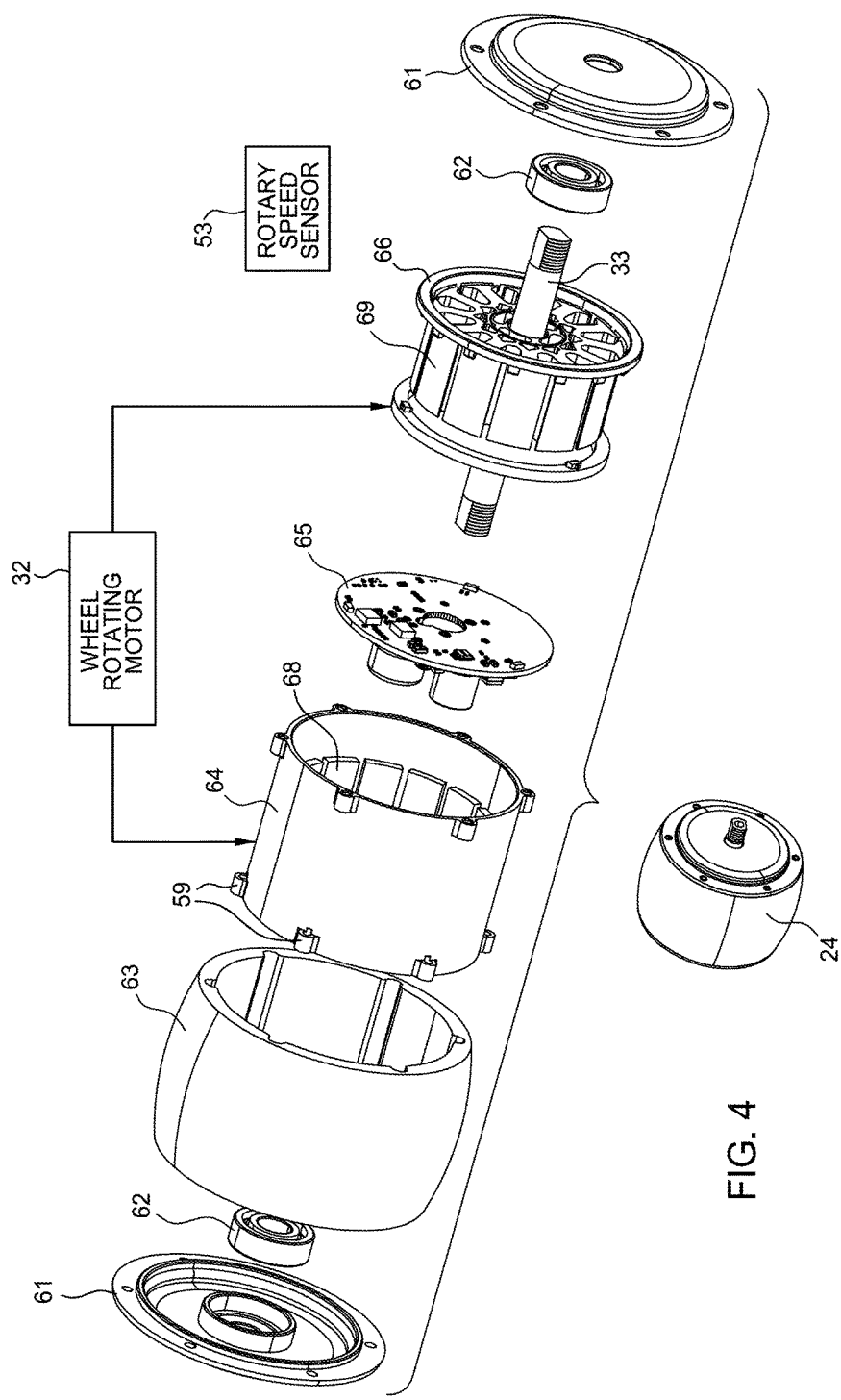
FIG. 4 is an exploded view of one of the motorized wheels of the smart luggage system according to one embodiment.

FIG. 4 is an exploded view of one motorized wheel 24 of the smart luggage system 100 according to one embodiment. The motorized wheel 24 includes outer covers 61, bearings 62, a housing 63, a rotor 64, a wheel control module 65, a stator 66, and a rotary speed sensor 53. The bearings 62, the rotor 64, the wheel control module 65, the stator 66, and the rotary speed sensor 53 are disposed within the housing 63. The outer covers 61 are coupled to the opposite sides of the housing 63 to enclose the components within. In one embodiment, the rotary speed sensor 53 may be positioned outside of the housing 63.

The housing 63 and the rotor 64 are rotationally coupled together through a pin and groove engagement 59. The rotor 64 includes a plurality of magnets 68 that interact with a plurality of windings 69 of the stator 66 to form a wheel rotating motor 32 configured to rotate the motorized wheel 24 when powered. The wheel rotating motor 32 may be any type of electric motor. The axle 32 extends through the housing 63 and the outer covers 61 to connect the motorized wheel 24 to the yoke 29B of the wheel mount 23.

The wheel control module 65 is configured to control the rotary speed of the motorized wheel 24 about the axle 32. The wheel control module 65 is configured to control the amount of power, e.g. current, supplied to the stator 66 of the wheel rotating motor 32, which controls the speed of rotation of the rotor 64 and housing 63 about the axle 67. The rotary speed sensor 53 is configured to measure the rotary speed of the motorized wheel 24. The rotary speed sensor 53 is configured to transmit a signal to the wheel control module 65 corresponding to the measured rotary speed.

In one embodiment, the wheel control module 65 is located within the housing 63 of the motorized wheel 24. In one embodiment, the wheel control module 65 is located inside the luggage 10 separate from the motorized wheel 24. In one embodiment, at least one wheel control module 65 is located within the housing 63 of one motorized wheel 24, and at least one other wheel control module 65 is located inside the luggage 10 separate from one motorized wheel 24.

Figure 5:
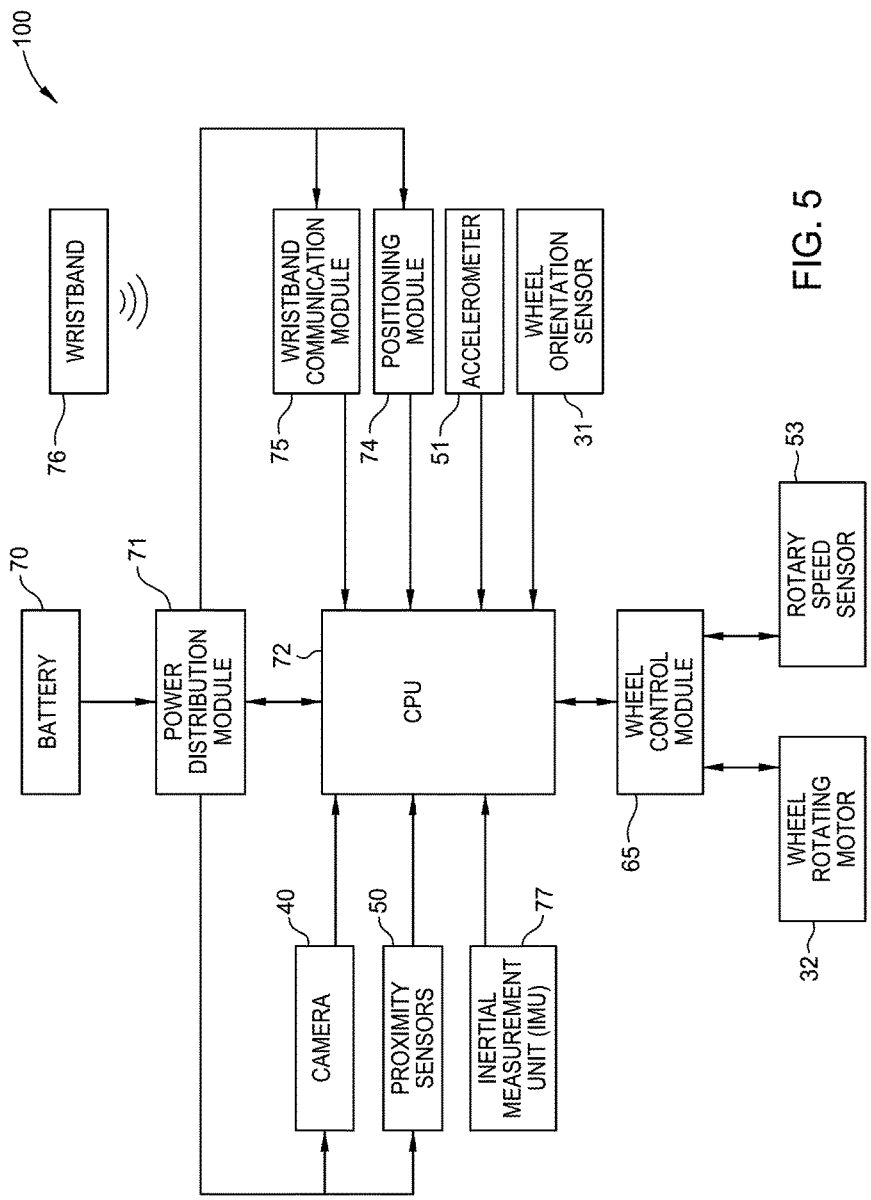
FIG. 5 is a block diagram of the smart luggage system according to one embodiment.

FIG. 5 is a block diagram of the smart luggage system 100 according to one embodiment. The system 100 includes a battery 70 in communication with a power distribution module 71. The power distribution module 71 is configured to distribute power supplied by the battery 70 to the other components of the system 100.

The system 100 includes a central processing unit ("CPU") 72 in communication with a wristband communication module 75, a positioning module 74, an accelerometer 51, and the wheel orientation sensor (e.g. the magnetic rotary encoder 25 and the magnet 28 as shown in FIG. 3).

A wristband 76 is used to communicate with the wristband communication module 75 via ultra-wideband, radio frequency identification (active and/or passive), Bluetooth (low energy), WiFi, and/or any other form of communication known in the art. The wristband 76 is configured to allow a user to send instructions to the CPU 72. The wristband 76 is also configured to allow a user to receive information from the CPU 72 regarding the operation of the system 100. In one embodiment, a remote control (such as the wristband 76) may be used to instruct the CPU 72 to move the luggage 10 in a given direction. A user can use the remote control to navigate the luggage 10 in a given direction.

The positioning module 74 is configured to communicate information regarding the position of the luggage 10 to the CPU 72 and the user (via the wristband 76 for example). The positioning module 74 may include GPS (outdoor), WiFi access points (indoor), and/or Bluetooth beacons (indoor) so that the user can find the location of the luggage 10 at any time, such as in the event that the luggage 10 is lost. The accelerometer 51 is configured to communicate information regarding the overall acceleration and/or speed of the luggage 10 to the CPU 72. The wheel orientation sensor 31 is configured to communicate information regarding the orientation of the motorized wheel 24 to the CPU 72.

The CPU 72 is also in communication with the camera 40, the proximity sensors 50, an inertial measurement unit ("IMU") 77, and the wheel control module 65. The camera 40 is configured to communicate information regarding the visual images and presence of nearby objects that the camera 40 records and/or detects to the CPU 72. The proximity sensors 50 are configured to communicate information regarding the presence of objects near the luggage 10 to the CPU 72. The IMU 77 is configured to communicate information regarding the dynamic movements of the luggage 10, such as the pitch, roll, yaw, acceleration, and/or angular rate of the luggage 10 to the CPU 72. For example, once the IMU 77 detects that the luggage 10 is tilting or falling over, then the CPU 72 will instruct the wheel control module 65 to stop the wheel rotating motors 32.

The wheel control module 65 is in communication with the rotary speed sensor 53 and the wheel rotating motor 32. The wheel control module 65 is configured to communicate information regarding the motorized wheel 24, such as the rotary speed measured by the rotary speed sensor 53, to the CPU 72. Although only one wheel control module 65 is shown, each wheel assembly 20 can include a separate wheel control module 65 in communication with the CPU 72. In one embodiment, the wheel control module 65 can be integrated into the CPU 72 as a single processing unit. According to one example, the CPU 72 includes a single wheel control module 65 to control all four wheel assemblies 20. According to one example, the CPU 72 includes four wheel control modules 65, one for each wheel assembly 20.

The CPU 72 is configured to analyze the information received from the various components (e.g. camera 40, sensors 31, 50, 53, modules 65, 74, 75, etc.) of the system 100 and perform the computational functions programmed into the CPU 72 based on the information to operate the system 100 as described herein. For example, the CPU 72 is configured to determine a given direction and speed based on the information. The CPU 72 is configured to control the direction and speed of the luggage 10 relative to a user and/or the surrounding environment. For example, the CPU 72 is configured to control the direction and the speed of the luggage 10 through the wheel control module 65 by instructing the wheel control module 65 to increase, decrease, or stop power, e.g. input current, supplied to each respective motorized wheel 24.

FIGS. 6A-6E illustrate a sequence of operation of the smart luggage system 100 according to one embodiment.

Figure 6:
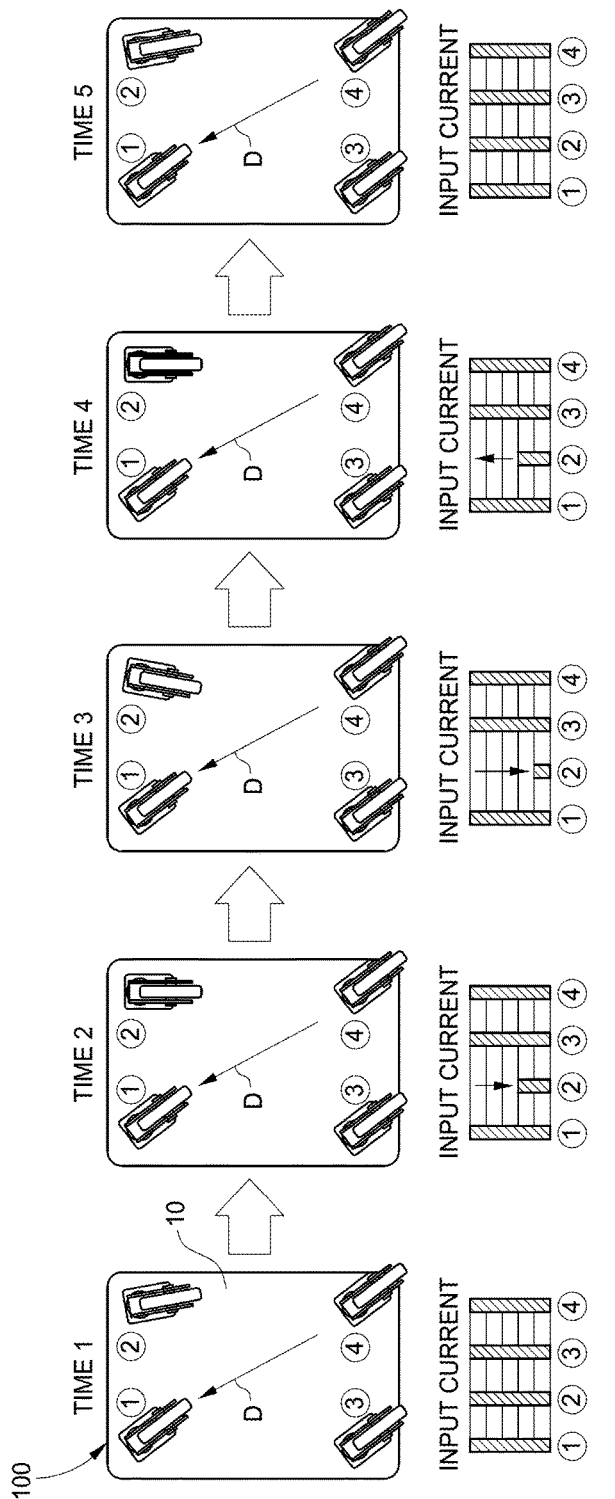
FIGS. 6A-6E illustrate a sequence of operation of the smart luggage system according to one embodiment.

FIG. 6A illustrates the system 100 moving in a given direction "D" with each wheel 1, 2, 3, 4 (e.g. the wheel assemblies 20) oriented in the given direction "D". The orientation of the wheels 1, 2, 3, 4 is measured by the wheel orientation sensor 31 and communicated to the CPU 72. Based on the wheel orientation, the CPU 72 directs the wheel control module 65 to provide the same amount of input current to each wheel 1, 2, 3, 4 to move the luggage 10 in the given direction "D".

FIG. 6B illustrates the system 100 moving in a given direction "D" but with the wheel 2 oriented in a direction that is different than the given direction "D". As the luggage 10 moves along the ground, the wheel 2 can be forced into a direction different by surrounding environmental influences, such as the roughness or unevenness of the ground. Once the unintended turning of the wheel 2 is detected by the wheel orientation sensor 31, the CPU 72 is configured to direct the wheel control module 65 to reduce or stop the input current to the wheel 2 if there is a force being applied by the wheel 2 that is forcing the luggage 10 in a direction that is different than the given direction "D".

FIG. 6C illustrates the system 100 moving in a given direction "D" but with the wheel 2 further turned in a direction different from the given direction "D". The CPU 72 is configured to direct the wheel control module 65 to further reduce or stop the input current to the wheel 2 to prevent the wheel 2 from influencing the luggage 10 to move in a direction different from the given direction "D". The wheel 2 may be allowed to move freely while the luggage 10 is driven by the remaining wheels 1, 3, 4 if all of the input current to the wheel 2 is stopped.

FIG. 6D illustrates the system 100 moving in a given direction "D" but with the wheel 2 oriented back into a direction that is similar to the given direction "D". The wheel 2 can be turned by contact with the roughness or unevenness of the ground and/or by the drive force applied to the luggage 10 by the remaining wheels 1, 3, 4. Once the wheel orientation sensor 31 detects that the wheel 2 is oriented into a direction that is similar to the given direction "D", the CPU 72 is configured to direct the wheel control module 65 to increase the input current to the wheel 2 to help force the orientation of the wheel 2 in the same direction as the given direction "D".

FIG. 6E illustrates the system 100 moving in a given direction "D" with all of the wheels 1, 2, 3, 4 oriented in the given direction "D". Based on the wheel orientation, the CPU 72 directs the wheel control module 65 to provide the same amount of input current to each wheel 1, 2, 3, 4 to continue to move the luggage 10 in the given direction "D".

FIGS. 6A-6E illustrate only one sequence of operation. The smart luggage system 100 is capable of operating across any number of sequences as the wheels 1, 2, 3, 4 are continuously moving over different ground surfaces. The CPU 72 continuously monitors the orientation and speed of each wheel 1, 2, 3, 4, as well as the other information provided by the other components of the system 100. The CPU 72 is configured to continuously instruct the wheel control module 65 to increase, decrease, or stop current input to any or all of the wheels 1, 2, 3, 4, respectively, as needed to maintain the movement of the luggage 10 in the given direction "D". The orientation, rotary speed, and/or input current supplied to each wheel 1, 2, 3, 4 may be different or the same as any other wheel 1, 2, 3, 4 at any point in time.

Figure 7:
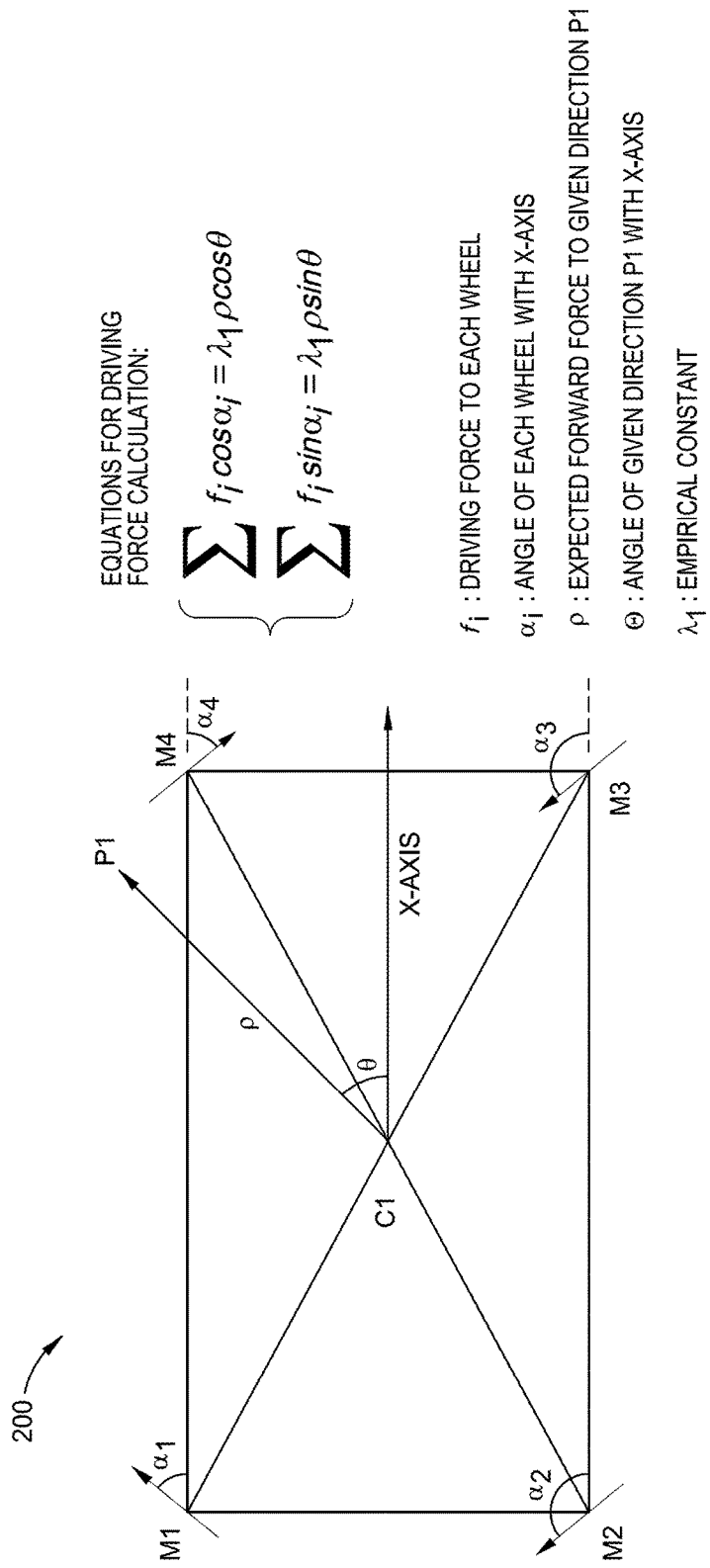
FIG. 7 illustrates a driving force calculation incorporated into the smart luggage system according to one embodiment.

FIG. 7 illustrates a driving force calculation programmed into the CPU 72 of the smart luggage system 100 (labeled as C1) according to one embodiment. Once there is an unintended turning of any wheel (labeled as M1, M2, M3, M4) that is detected by the wheel orientation sensor 31, then the CPU 72 will instruct the wheel control module 65 to reduce or stop the input current to the respective wheel rotating motor 32 if there is a driving force being applied by any of the wheels in a direction different than the expected forward force to the given direction P1. As shown in FIG. 7, the angle of each wheel and the angle of the given direction P1 are measured relative to the X-axis.

Figure 8:
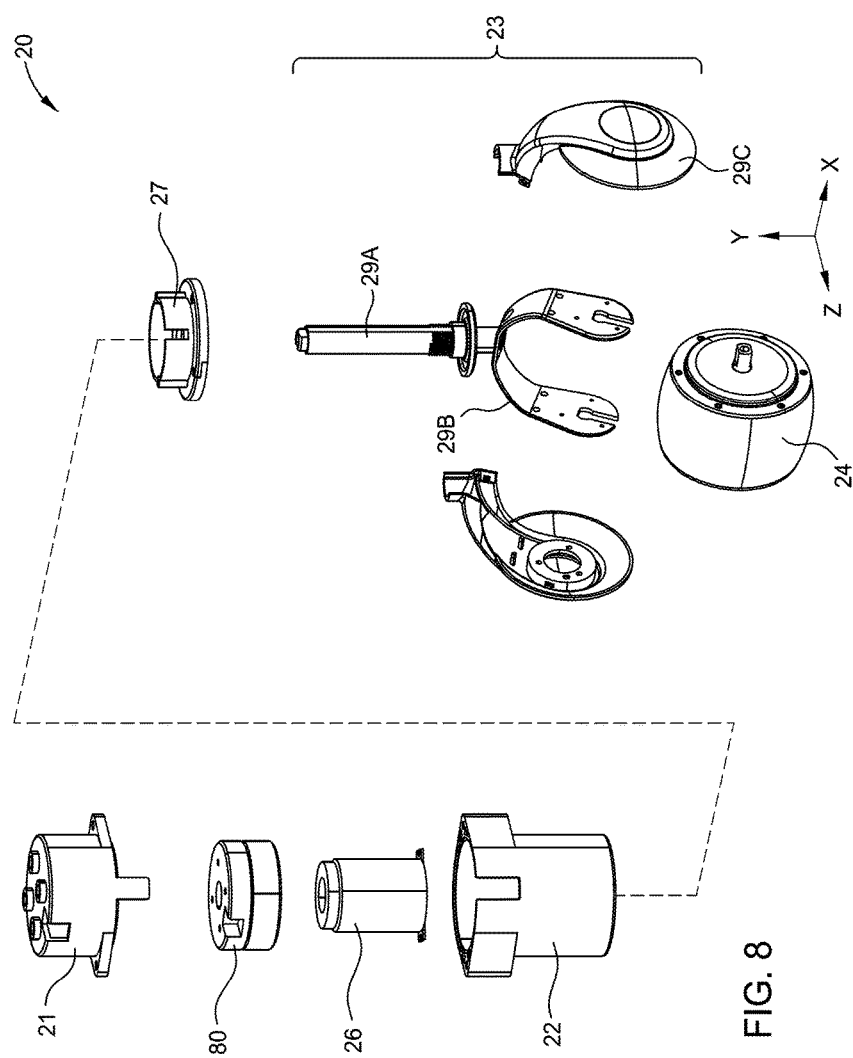
FIG. 8 is an exploded view of one of the wheel assemblies of the smart luggage system according to another embodiment.

FIG. 8 is an exploded view of one wheel assembly 20 of the smart luggage system 100 according to another embodiment. The wheel assembly 20 shown in FIG. 8 is similar as the wheel assembly 20 shown in FIG. 3 but has the following difference. The wheel orientation sensor 31 (e.g. the magnetic rotary encoder 25 and the magnet 28) has been replaced with a wheel steering motor 80. The wheel steering motor 80 is disposed within the upper slip ring housing 21 and the lower slip ring housing 22 above the slip ring 26. The wheel steering motor 80 is configured to control the orientation of the motorized wheel 24 to direct the luggage 10 in the given direction. For example, the wheel steering motor 80 is configured to rotate the wheel assembly 20 about the Y-axis to orient the motorized wheel 24 in the given direction.

In one embodiment, the two rear wheel assemblies 20 may include both the wheel steering motors 80 and the wheel rotating motors, while the two front wheel assemblies 20 include only the wheel steering motors 80. In one embodiment, the two front wheel assemblies 20 may include both the wheel steering motors 80 and the wheel rotating motors, while the two rear wheel assemblies 20 include only the wheel steering motors 80. In one embodiment, any one, two, or three of the wheel assemblies 20 may include any combination of the wheel steering motors 80 and the wheel rotating motors. In one embodiment, the number of wheel steering motors 80 is less than the number of wheel rotating motors.

Figure 9:
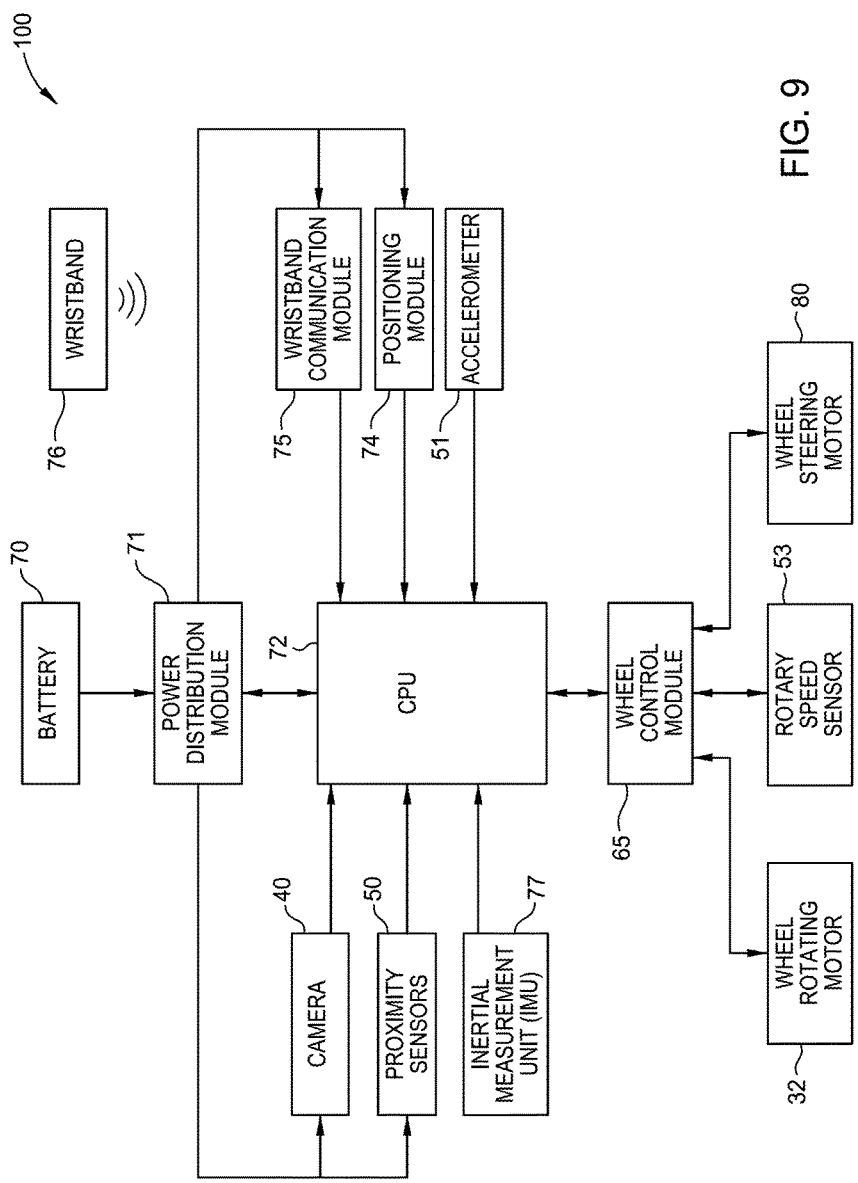
FIG. 9 is a block diagram of the smart luggage system according to another embodiment.

FIG. 9 is a block diagram of the smart luggage system 100 according to the embodiment of FIG. 8. The block diagram shown in FIG. 9 is similar to the block diagram shown in FIG. 5 but shows the wheel steering motor 80 instead of the wheel orientation sensor 31. The wheel steering motor 80 is in communication with the wheel control module 65. The wheel control module 65 is configured to communicate information regarding the wheel steering motor 80 to the CPU 72.

The CPU 72 is configured to analyze the information received from the various components of the system 100 and perform the computational functions programmed into the CPU 72 to operate the system 100. The CPU 72 is configured to determine a given direction and speed based on the information. The CPU 72 is configured to control the direction and speed of the luggage 10 relative to a user and/or the surrounding environment.

For example, the CPU 72 is configured to control the direction of the luggage 10 through the wheel control module 65, and in particular, by directing the wheel steering motor 80 to orient each respective motorized wheel 24 in the given direction. The CPU 72 is also configured to control the speed of the luggage 10 through the wheel control module 65, and in particular, by directing the wheel control module 65 to increase, decrease, or stop power, e.g. current, supplied to each respective wheel rotating motor 32. The combination of the wheel steering motor 80 and the wheel rotating motor 32 allows the smart luggage system 100 to continuously move in the given direction, while at the same time maneuvering over different ground surfaces and avoiding nearby obstacles.

Figure 10:
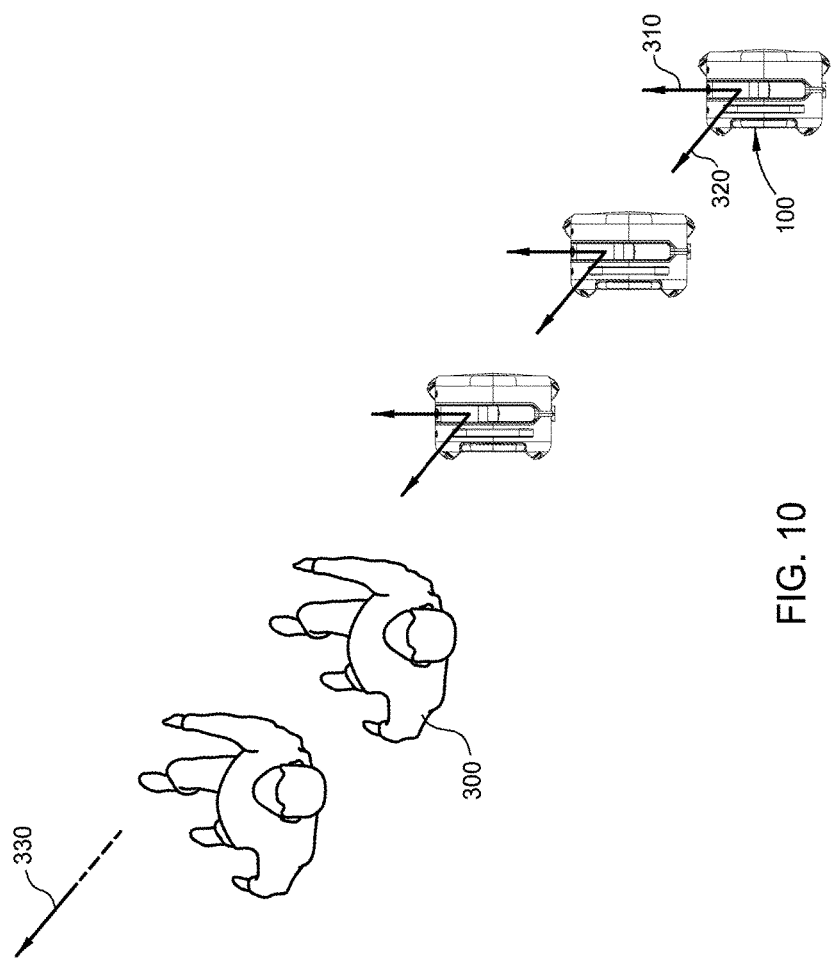
FIG. 10 illustrates a travel path of the smart luggage system when in operation with a user.

FIG. 10 illustrates a travel path of the smart luggage system 100 when in operation with a user 300 according to one embodiment. The smart luggage system 100 has the ability to orient the luggage 10 in a head direction 310 while moving in a forward direction 320 that is different than the head direction 310. As shown, the user 300 can be walking in a given direction 330 that is in a diagonal direction relative to the head direction 310 of the luggage 10. The system 100 does not have to steer the luggage 10 in advance but rather has the ability move the luggage 10 along the forward direction 320 to follow the given direction 330, while maintaining the luggage 10 in the head direction 310. The forward direction 320 can be parallel to the given direction 330.

In one embodiment, the smart luggage system 100 is configured to autonomously follow any one or more users, such as a person, in a given direction. In one embodiment, the smart luggage system 100 is configured to autonomously follow any one or more objects in a given direction. In one embodiment, the smart luggage system 100 is configured to autonomously move in a given direction based on instructions received from a user via a remote control. In one embodiment, the smart luggage system 100 is configured to autonomously move in any given direction from one location to another location based on a set of pre-programmed instructions provided by the user.

Figure 11:
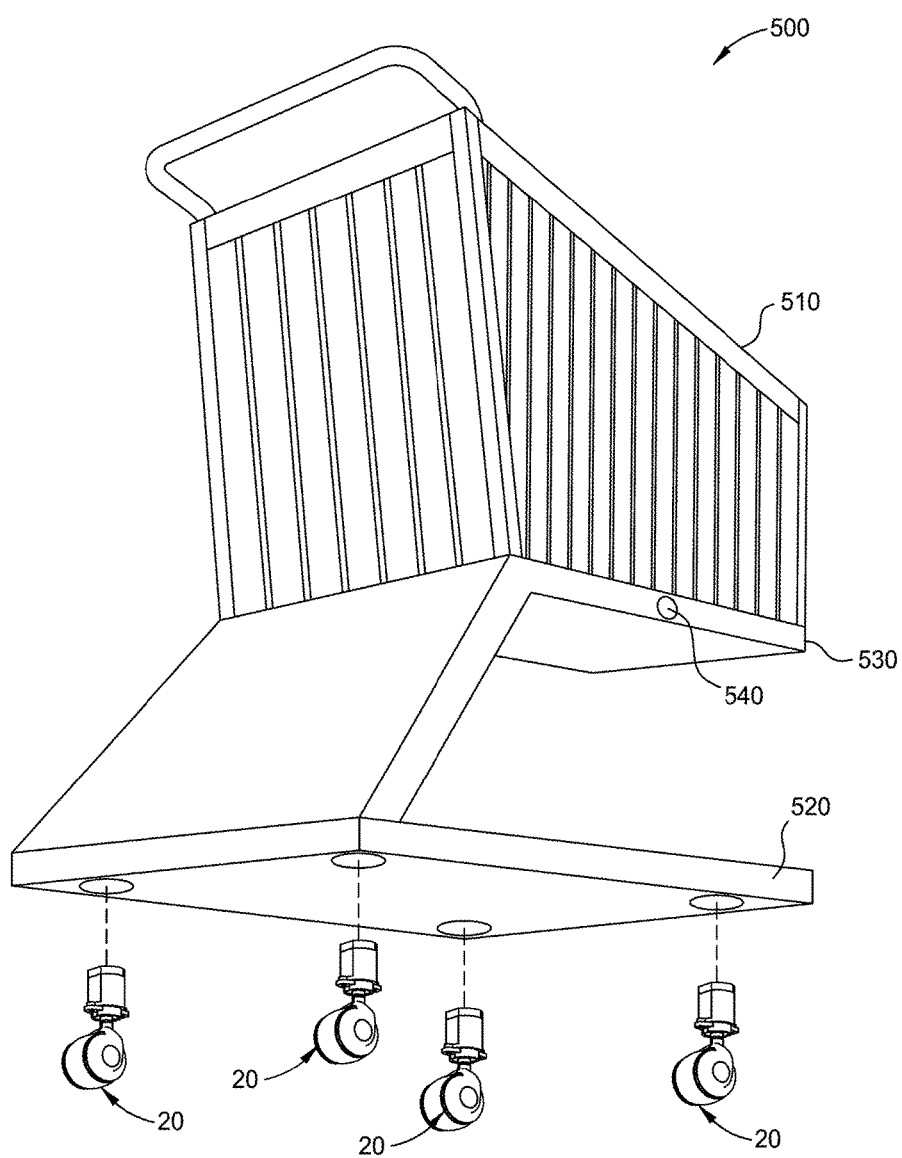
FIG. 11 is a perspective view of a smart shopping cart system according to one embodiment.

FIG. 11 is a perspective view of a smart shopping cart system 500 according to one embodiment. All of the embodiments described herein with respect to the smart luggage system 100 may be incorporated into the smart shopping cart system 500. For example, the system 500 includes the wheel assemblies 20 as described above with respect to the smart luggage system 100.

The system 500 includes a body 510 coupled to a base 520. The body 510 may be a cart, basket, or any other type of container that can be used to contain and/or transport items. Any of the components of the system 500, such as the battery 70, the power distribution module 71, the CPU 72, the wristband communication module 75, the positioning module 74, the inertial measurement unit 77, the accelerometer 51, and/or the wheel control module 65 may be disposed in the body 510 and/or the base 520. The wheel assemblies 20 are coupled to the base 520 and configured to move the system 500 in a given direction similar to the movement of the luggage 10 described above. The wheel assemblies 20 are configured to move the body 510 along a forward direction that is different than a head direction of the body 510.

The front side of the system 500 may include one or more cameras, proximity sensors, and/or any other type of sensing device as identified by reference number 530. The left side of the system 500 may also include one or more cameras, proximity sensors, and/or any other type of sensing device as identified by reference number 540. Any number of cameras, proximity sensors, and/or any other type of sensing device may be coupled to any side of the body 510 and/or base 520.

Figure 12:
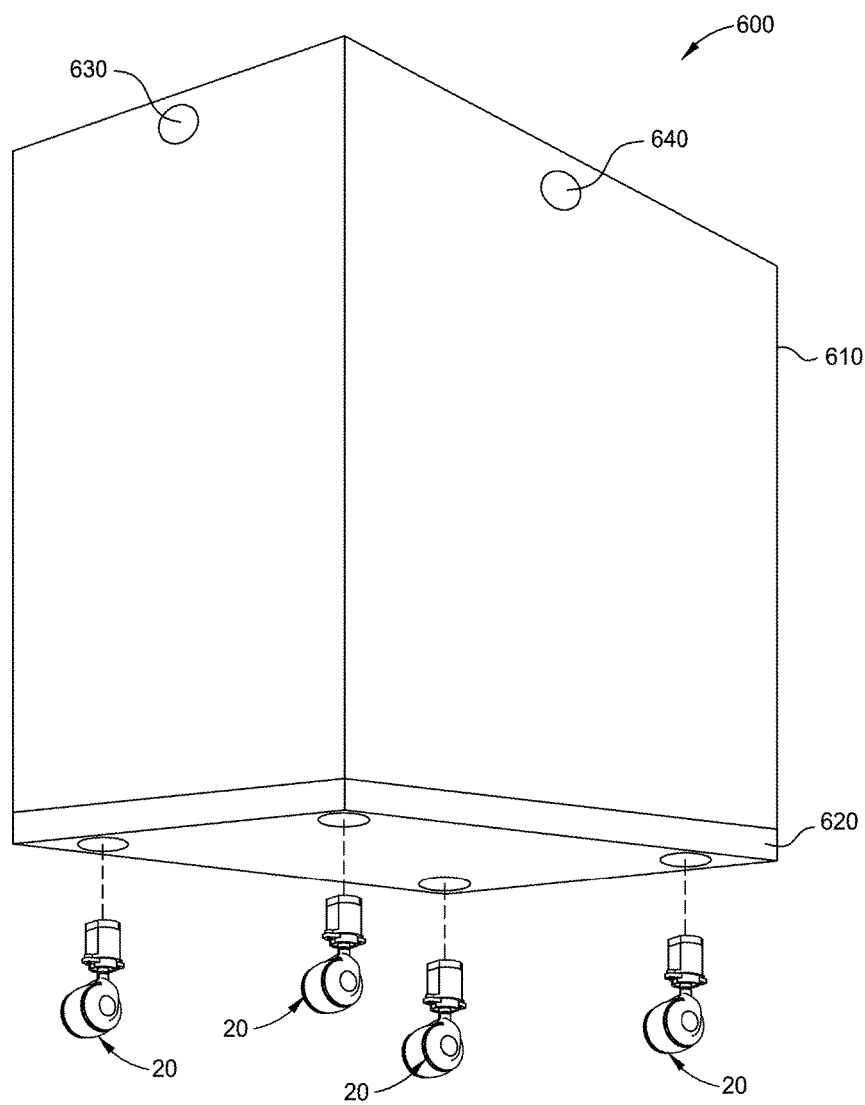
FIG. 12 is a perspective view of a smart self-driving system according to one embodiment.

FIG. 12 is a perspective view of a smart self-driving system 600 according to one embodiment. All of the embodiments described herein with respect to the smart luggage system 100 may be incorporated into the smart self-driving system 600. For example, the system 600 includes the wheel assemblies 20 as described above with respect to the smart luggage system 100.

The system 600 includes a body 610 coupled to a base 620. The body 610 and the base 620 may be separate components or may be formed as a single component. Any of the components of the system 600, such as the battery 70, the power distribution module 71, the CPU 72, the wristband communication module 75, the positioning module 74, the inertial measurement unit 77, the accelerometer 51, and/or the wheel control module 65 may be disposed in the body 610 and/or the base 620. The wheel assemblies 20 are coupled to the base 620 and configured to move the system 600 in a given direction similar to the movement of the luggage 10 described above. The wheel assemblies 20 are configured to move the body 610 along a forward direction that is different than a head direction of the body 610.

The front side of the system 600 may include one or more cameras, proximity sensors, and/or any other type of sensing device as identified by reference number 630. The right side of the system 600 may also include one or more cameras, proximity sensors, and/or any other type of sensing device as identified by reference number 640. Any number of cameras, proximity sensors, and/or any other type of sensing device may be coupled to any side of the body 610 and/or base 620.

In one embodiment, the body 610 may be a container used to contain and/or transport items placed inside the body 610. In one embodiment, the body 610 may be a support member used to support and/or transport items placed on top of the body 610. In one embodiment, the body 610 may be a housing used to protect the components of the system 600 and does not need to support the weight of any other items. For example, the system 600 can be used to deliver food to a house, a hotel room, and/or a table at a restaurant. For another example, the system 600 can be used as a security monitoring device configured to move around and monitor a given area.

While the foregoing is directed to embodiments of the disclosure, other and further embodiments of the disclosure thus may be devised without departing from the basic scope thereof, and the scope thereof is determined by the claims that follow.

The invention claimed is:

1. A luggage system, comprising:
    a piece of luggage configured to store items for transport;
    three or more wheel assemblies coupled to the luggage and configured to rotate and roll in a given direction, wherein two or more of the wheel assemblies include a wheel rotating motor configured to rotate a wheel of the wheel assembly to move the luggage in the given direction; and
    a central processing unit configured to instruct a wheel control module to increase, decrease, or stop input current to the wheel rotating motors when the wheel applies a force to the luggage that is in a direction different than the given direction.

2. The system of claim 1, wherein one or more of the wheel assemblies further include a wheel steering motor configured to orient the wheel in the given direction, and wherein a number of wheel assemblies having the wheel steering motor is less than a number of wheel assemblies having the wheel rotating motors.

3. The system of claim 1, wherein an axis about which the wheel assemblies roll is offset from an axis about which the wheel assemblies rotate.

4. The system of claim 1, wherein an axis about which the wheel assemblies roll is mutually orthogonal and coincides with an axis about which the wheel assemblies rotate.

5. The system of claim 1, wherein the wheel assemblies that include the wheel rotating motor further include a wheel orientation sensor configured to measure the orientation of the wheel.

6. The system of claim 5, wherein the wheel orientation sensor includes a magnetic rotary encoder and a magnet.

7. The system of claim 1, further comprising a wheel control module configured to control input current to the wheel rotating motors.

8. The system of claim 1, wherein the wheel control module and the central processing unit are integrated together in the form of a single processing unit.

9. The system of claim 1, where the system includes four wheel assemblies coupled to a bottom of the luggage, and wherein all four of the wheel assemblies include wheel rotating motors.

10. The system of claim 1, further comprising a camera, a proximity sensor, and a central processing unit coupled to the luggage, wherein the central processing unit is configured to receive information from at least one of the camera and the proximity sensor to determine the given direction.

11. The system of claim 1, further comprising a central processing unit coupled to the luggage, and a remote control configured to instruct the central processing unit to move the luggage in the given direction.

12. The system of claim 1, wherein the luggage includes a handle to allow a user to push, pull, or lift the luggage, and wherein the handle includes one or more touch sensors configured to switch the system to a manual control mode for manual operation by the user when touched by the user.

13. The system of claim 1, wherein the wheel assemblies are configured to move the luggage along a forward direction that is different than a head direction of the luggage.

14. A self-driving system, comprising:
    a body;
    three or more wheel assemblies coupled to the body and configured to rotate and roll in a given direction, wherein two or more of the wheel assemblies include a wheel rotating motor configured to rotate a wheel of the wheel assembly to move the body in the given direction; and
    a central processing unit configured to instruct a wheel control module to increase, decrease, or stop input current to the wheel rotating motors when the wheel applies a force to the body that is in a direction different than the given direction.

15. The system of claim 14, wherein one or more of the wheel assemblies further include a wheel steering motor configured to orient the wheel in the given direction, and wherein a number of wheel assemblies having the wheel steering motor is less than a number of wheel assemblies having the wheel rotating motors.

16. The system of claim 14, wherein an axis about which the wheel assemblies roll is offset from an axis about which the wheel assemblies rotate.

17. The system of claim 14, wherein an axis about which the wheel assemblies roll is mutually orthogonal and coincides with an axis about which the wheel assemblies rotate.

18. The system of claim 14, wherein the wheel assemblies that include the wheel rotating motor further include a wheel orientation sensor configured to measure the orientation of the wheel, and wherein the wheel orientation sensor includes a magnetic rotary encoder and a magnet.

19. The system of claim 14, further comprising a wheel control module configured to control input current to the wheel rotating motors.

20. The system of claim 14, where the system includes four wheel assemblies coupled to a base of the body, and wherein all four of the wheel assemblies include wheel rotating motors.

21. The system of claim 14, further comprising a camera, a proximity sensor, and a central processing unit coupled to the body, wherein the central processing unit is configured to receive information from at least one of the camera and the proximity sensor to determine the given direction.

22. The system of claim 14, further comprising a central processing unit coupled to the body, and a remote control configured to instruct the central processing unit to move the body in the given direction.

23. The system of claim 14, wherein the body includes a handle to allow a user to push, pull, or lift the body, and wherein the handle includes a touch sensor configured to switch the system to a manual control mode for manual operation by a user when touched by the user.

24. The system of claim 14, wherein the wheel assemblies are configured to move the body along a forward direction that is different than a head direction of the body.

25. The system of claim 14, wherein the body is in the form of a luggage or a shopping cart.

26. A luggage system, comprising:
    a piece of luggage configured to store items for transport; and
    three or more wheel assemblies coupled to the luggage and configured to rotate and roll in a given direction, wherein two or more of the wheel assemblies include a wheel rotating motor configured to rotate a wheel of the wheel assembly to move the luggage in the given direction, and wherein the wheel assemblies are configured to move the luggage along a forward direction that is different than a head direction of the luggage.

27. A self-driving system, comprising:

a body; and three or more wheel assemblies coupled to the body and configured to rotate and roll in a given direction, wherein two or more of the wheel assemblies include a wheel rotating motor configured to rotate a wheel of the wheel assembly to move the body in the given direction, and wherein the wheel assemblies are configured to move the body along a forward direction that is different than a head direction of the body.

* * * * *